United States Patent
Yedalla

(10) Patent No.: US 10,747,657 B2
(45) Date of Patent: Aug. 18, 2020

(54) METHODS, SYSTEMS, APPARATUSES AND DEVICES FOR FACILITATING EXECUTION OF TEST CASES

(71) Applicant: JayaSudha Yedalla, Plano, TX (US)

(72) Inventor: JayaSudha Yedalla, Plano, TX (US)

( * ) Notice: Subject to any disclaimer, the term of this patent is extended or adjusted under 35 U.S.C. 154(b) by 95 days.

(21) Appl. No.: 16/243,818

(22) Filed: Jan. 9, 2019

(65) Prior Publication Data

US 2019/0227916 A1    Jul. 25, 2019

Related U.S. Application Data

(60) Provisional application No. 62/619,495, filed on Jan. 19, 2018.

(51) Int. Cl.
   *G06F 11/36* (2006.01)

(52) U.S. Cl.
   CPC ...... *G06F 11/3688* (2013.01); *G06F 11/3692* (2013.01)

(58) Field of Classification Search
   CPC ......................... G06F 11/3688; G06F 11/3692
   See application file for complete search history.

(56) References Cited

U.S. PATENT DOCUMENTS

| | | | |
|---|---|---|---|
| 7,596,731 B1 * | 9/2009 | Sharma | G01R 31/2894 324/762.02 |
| 9,507,699 B2 * | 11/2016 | Provost | G06F 11/3688 |
| 10,353,810 B2 * | 7/2019 | Varadarajan | G06F 11/3688 |
| 2008/0172652 A1 * | 7/2008 | Davia | G06F 11/3684 717/124 |
| 2013/0111267 A1 * | 5/2013 | Beryoza | G06F 11/3688 714/32 |
| 2014/0115565 A1 * | 4/2014 | Abraham | G06F 8/30 717/128 |

* cited by examiner

*Primary Examiner* — Joseph R Kudirka

(57) ABSTRACT

Disclosed herein is a system for facilitating execution of test cases, in accordance with some embodiments. Accordingly, the system may include a communication device configured for receiving a first test case data including a plurality of first test steps and a second test case data including a plurality of second test steps. Further, the system may include a processing device configured for identifying a common test step between the plurality of first test steps and the plurality of second test steps. Further, the processing device may be configured for generating a plurality of first test results associated with the plurality of first test steps based on execution of the plurality of first test steps. Further, the system may include a storage device configured for storing the plurality of first test results in association with the plurality of first test steps.

20 Claims, 8 Drawing Sheets

METHODS, SYSTEMS, APPARATUSES AND DEVICES FOR FACILITATING EXECUTION OF TEST CASES

The current application claims a priority to the U.S. Provisional Patent application Ser. No. 62/619,495 filed on Jan. 19, 2018.

FIELD OF THE INVENTION

Generally, the present disclosure relates to the field of data processing. More specifically, the present disclosure relates to methods, systems, apparatuses and devices for facilitating execution of test cases.

BACKGROUND OF THE INVENTION

Testing is an integral part of product development. Testing is performed to check if the product is working as desired. Testing helps in identifying faults which may be then rectified. This involves hardware testing and software testing.

Accordingly, in organizations, test scenarios are generated to test various functions of a product. The test scenarios get accumulated over a period of time. The testing process may be time sensitive as often testing is performed before a major release of the product. However, it may be time-consuming to execute all the test scenarios accumulated over time.

Therefore, there is a need for improved methods, systems, apparatuses and devices for facilitating execution of test cases that may overcome one or more of the above-mentioned problems and/or limitations.

BRIEF DESCRIPTION OF THE DRAWINGS

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a method of facilitating execution of test cases, in accordance with some embodiments. Accordingly, the method may include a step of receiving, using a communication device, a first test case data including a plurality of first test steps. Further, the method may include a step of receiving, using the communication device, a second test case data including a plurality of second test steps. Further, the method may include a step of identifying, using a processing device, a common test step between the plurality of first test steps and the plurality of second test steps. Further, the method may include a step of generating, using the processing device, a plurality of first test results associated with the plurality of first test steps based on execution of the plurality of first test steps. Further, the method may include a step of storing, using a storage device, the plurality of first test results in association with the plurality of first test steps. Further, the method may include a step of associating, using the processing device, each of the first instance of the common test step and the second instance of the common test step with the common test result corresponding to the common test step. Further, the method may include a step of generating, using the processing device, a plurality of second test results associated with the plurality of second test steps based on the associating and execution of the plurality of second test steps Further disclosed herein is a system for facilitating execution of test cases, in accordance with some embodiments. Accordingly, the system may include a communication device configured for receiving a first test case data including a plurality of first test steps. Further, the communication device may be configured for receiving a second test case data including a plurality of second test steps. Further, the system may include a processing device configured for identifying a common test step between the plurality of first test steps and the plurality of second test steps. Further, the processing device may be configured for generating a plurality of first test results associated with the plurality of first test steps based on execution of the plurality of first test steps. Further, the processing device may be configured for associating each of the first instance of the common test step and the second instance of the common test step with the common test result corresponding to the common test step. Further, the processing device may be configured for generating a plurality of second test results associated with the plurality of second test steps based on the associating and execution of the plurality of second test steps, except the second instance of the common test step. Further, the system may include a storage device configured for storing the plurality of first test results in association with the plurality of first test steps.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

Figure 1:
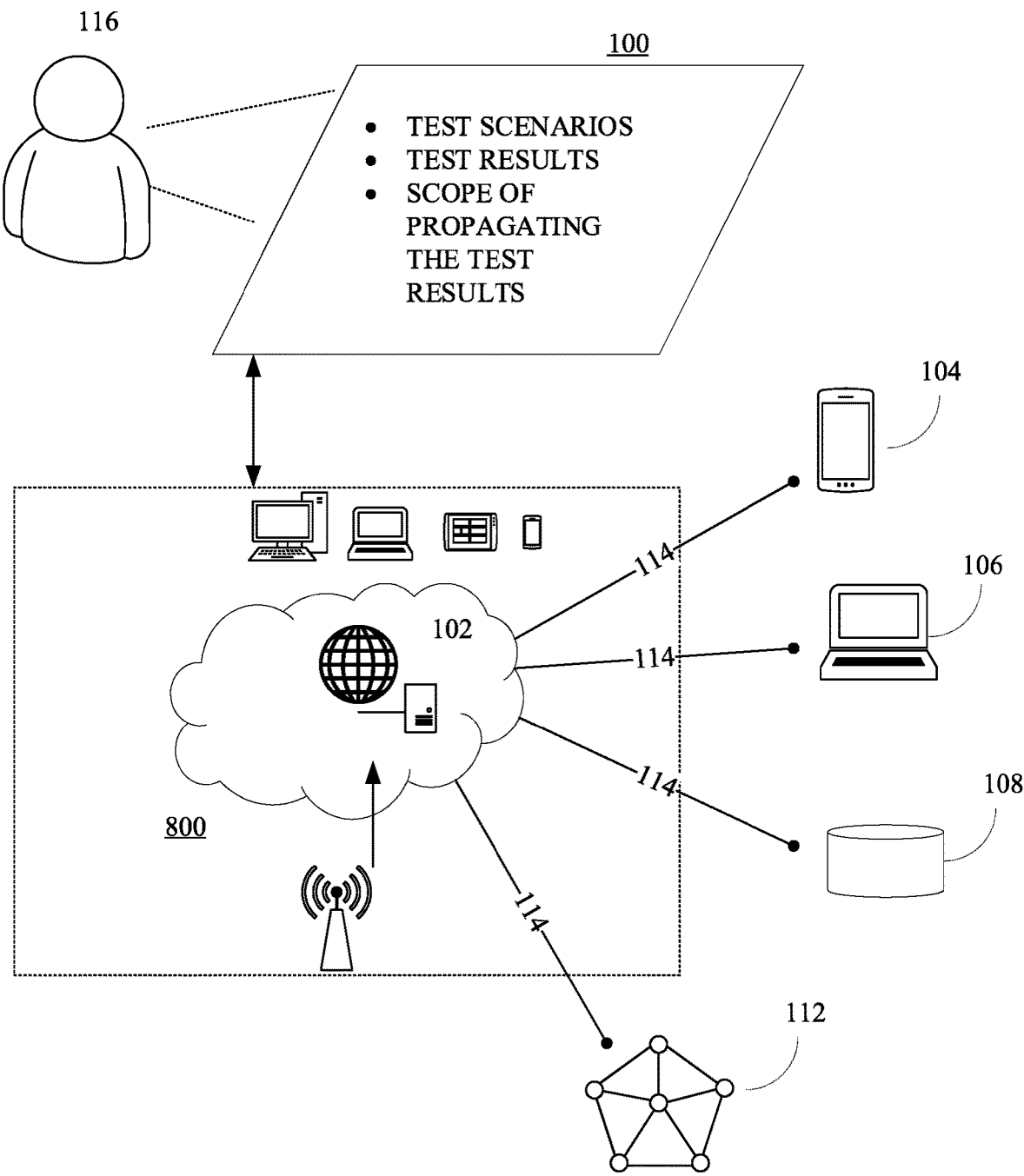

FIG. 1 is an illustration of an online platform consistent with various embodiments of the present disclosure.

Figure 2:
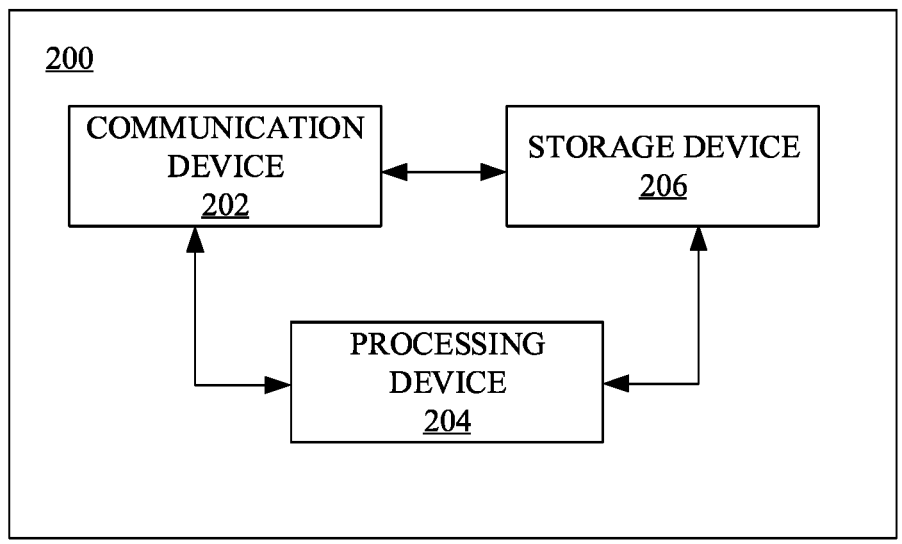

FIG. 2 shows a system for facilitating execution of test cases, in accordance with some embodiments.

Figure 3:
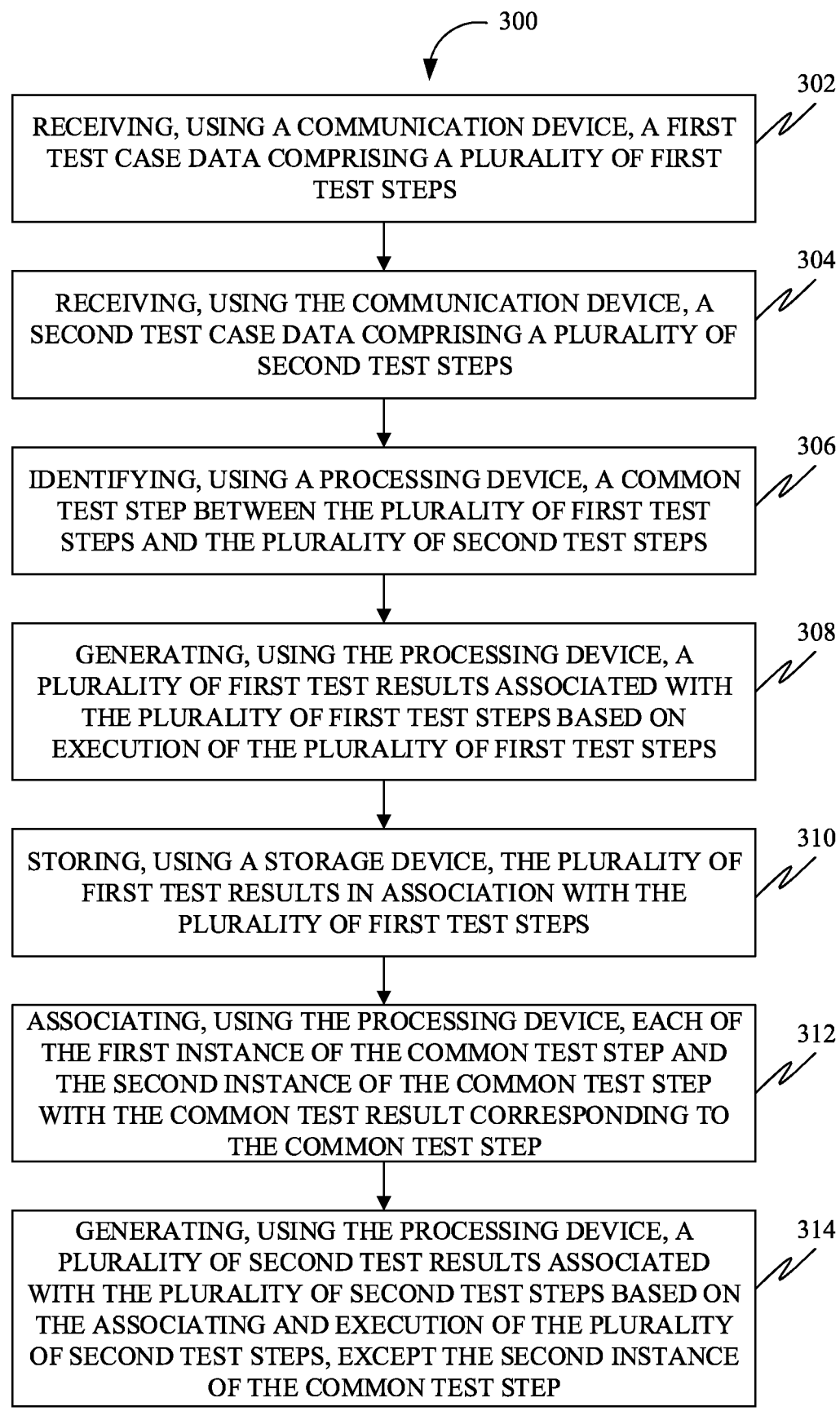

FIG. 3 is a flowchart of a method of facilitating execution of test cases, in accordance with some embodiments.

Figure 4:
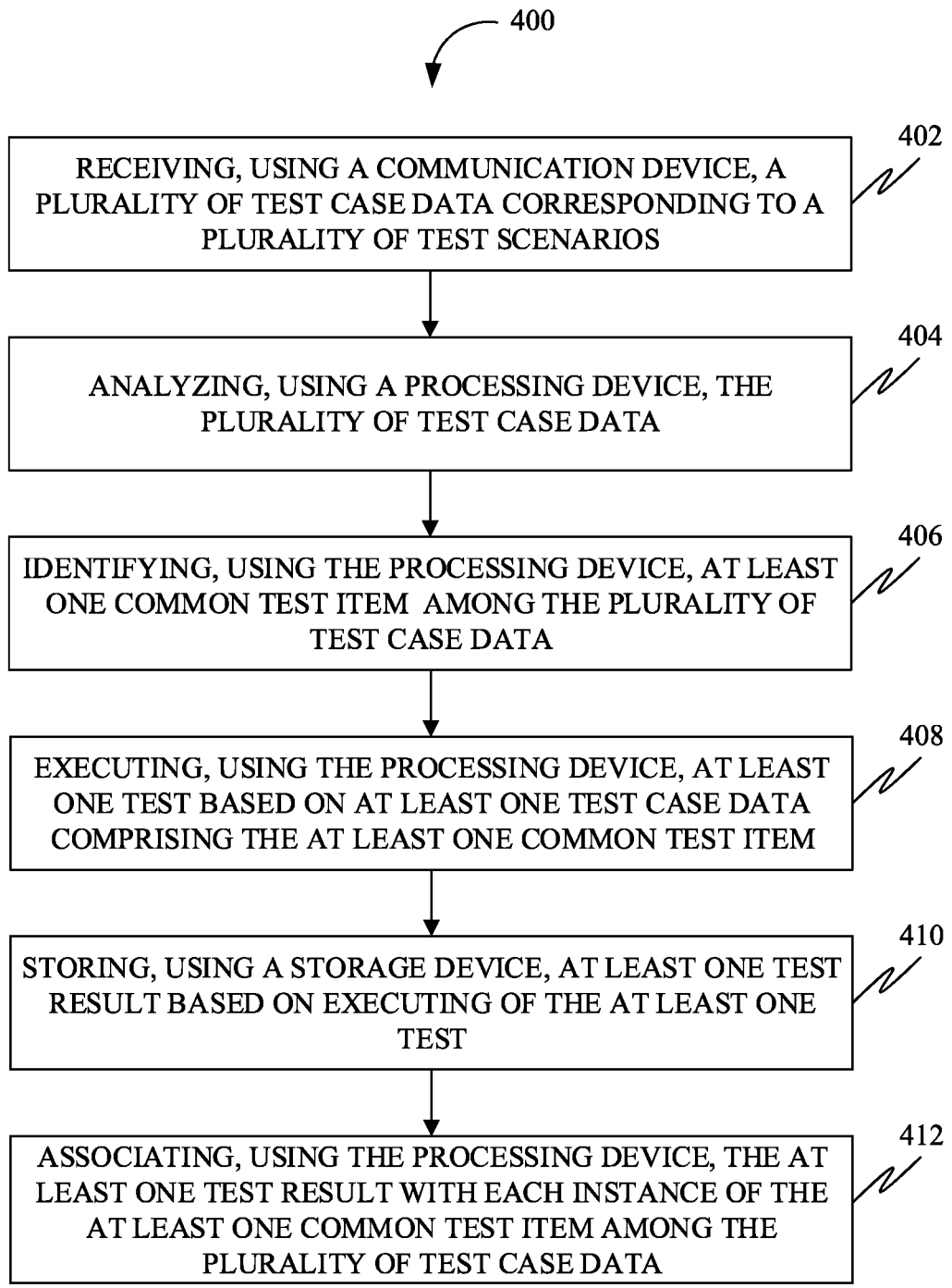

FIG. 4 is a flowchart of a method of facilitating execution of test scenarios, in accordance with some embodiments.

Figure 5:
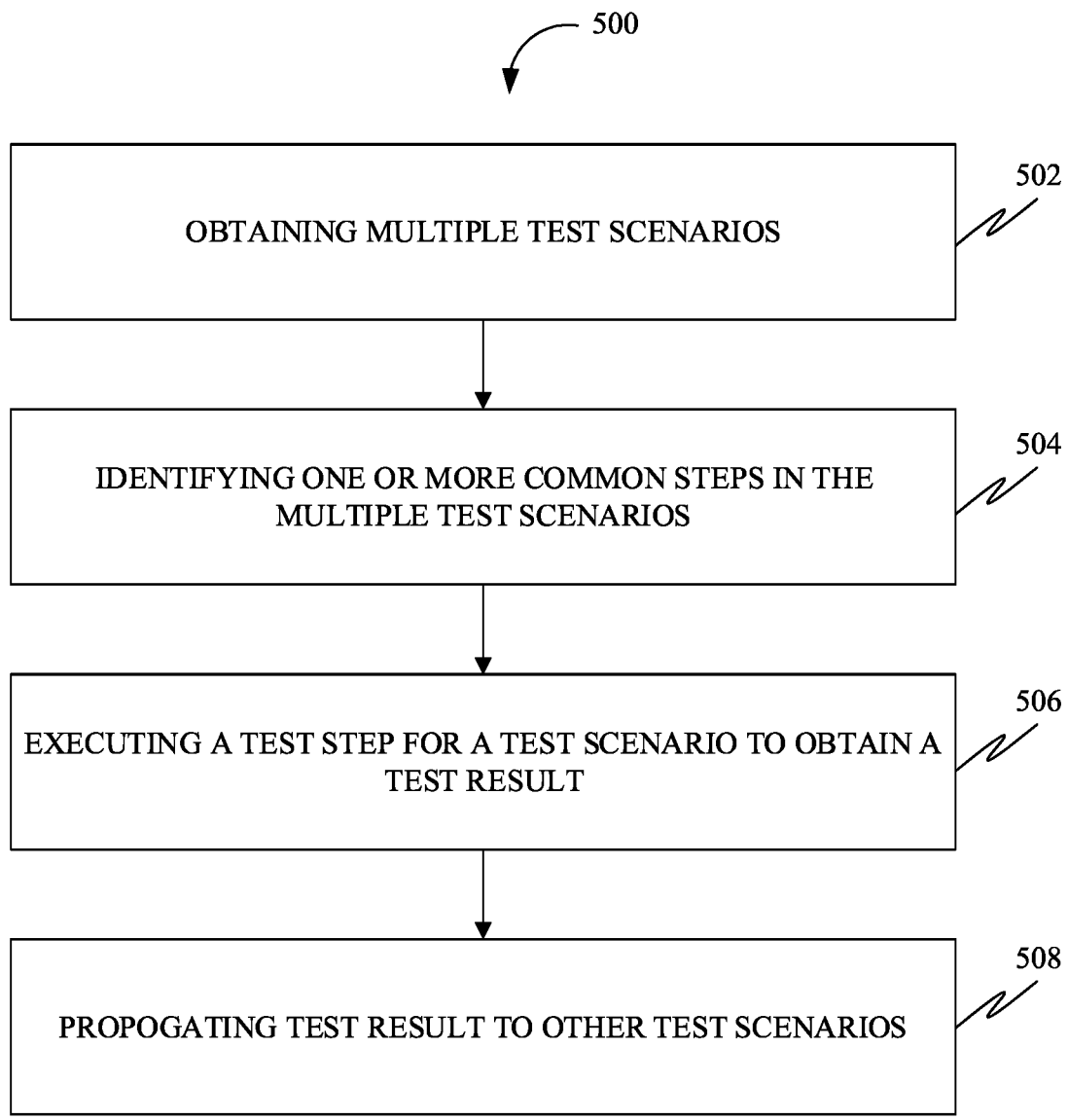

FIG. 5 illustrates a flowchart of a method for performing testing, in accordance with some embodiments.

Figure 6:
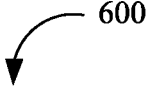

FIG. 6 illustrates a table containing test results corresponding to three test scenarios (such as Test Scenario 1, Test Scenario 2, Test Scenario 3) in a first test cycle (such as TestCycle1), in accordance with an exemplary embodiment.

Figure 7:
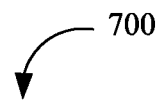

FIG. 7 illustrates a table containing test results corresponding to three test scenarios (such as Test Scenario 4, Test Scenario 5, Test Scenario 6) in a second test cycle (such as TestCycle2), in accordance with an exemplary embodiment.

Figure 8:
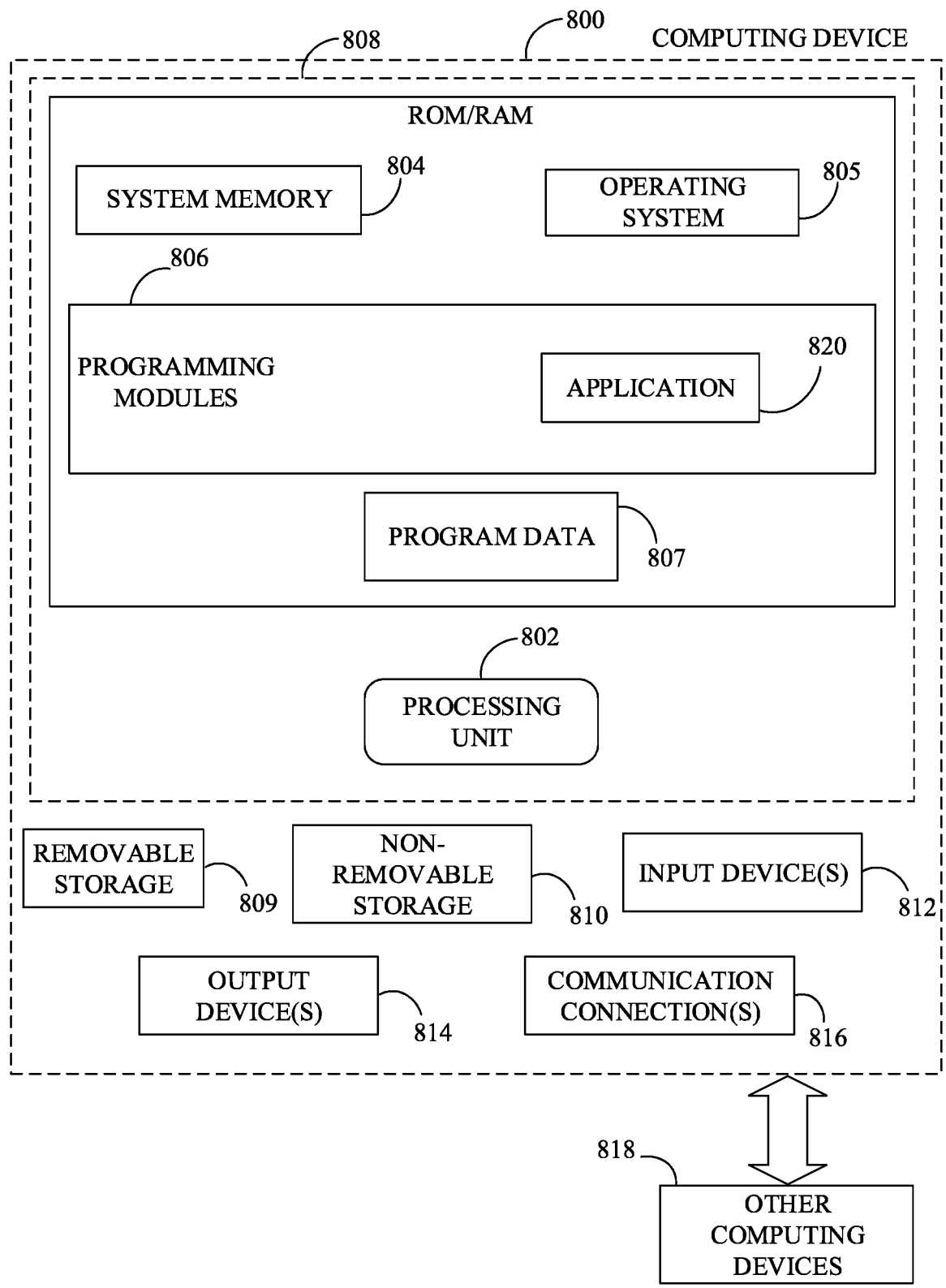

FIG. 8 is a block diagram of a computing device for implementing the methods disclosed herein, in accordance with some embodiments.

DETAIL DESCRIPTIONS OF THE INVENTION

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of execution of test cases, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, public database, a private database and so on.

Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer etc.) and/or possession of a machine readable secret data (e.g. encryption key, decryption key, bar codes, etc.) and/or or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smart-card with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

FIG. 1 is an illustration of an online platform 100 consistent with various embodiments of the present disclosure. By way of non-limiting example, the online platform 100 to facilitate execution of test cases may be hosted on a centralized server 102, such as, for example, a cloud computing service. The centralized server 102 may communicate with other network entities, such as, for example, a mobile device 104 (such as a smartphone, a laptop, a tablet computer etc.), other electronic devices 106 (such as desktop computers, server computers etc.), databases 108, and sensor network 112 over a communication network 114, such as, but not limited to, the Internet. Further, the databases 108, in an instance, may include a Test Management System (TMS). Further, the TMS may also be implemented on one or more of the centralized server 102, the mobile device 104 and other electronic devices 106.

Further, users of the online platform 100 may include relevant parties such as, but not limited to, software/hardware testers, software/hardware developers, business analysts, end users, administrators, service providers, service consumers and so on. Accordingly, in some instances, electronic devices operated by the one or more relevant parties may be in communication with the online platform 100. The online platform 100 may enable the users to perform software and hardware testing more effectively.

A user 116, such as the one or more relevant parties, may access online platform 100 through a web based software application or browser. The web based software application may be embodied as, for example, but not be limited to, a website, a web application, a desktop application, and a mobile application compatible with a computing device 800.

FIG. 2 shows a system 200 for facilitating execution of test cases, in accordance with some embodiments. The system 200 may include a communication device 202 configured for receiving a first test case data including a plurality of first test steps. Further, the first test case data corresponds to a first test scenario. Further, in some embodiments, the first test case data may include a first description of a first operation to be performed, a first test data, a first precondition, a first expected result of the first operation, and a first post-condition.

In an instance, the first test scenario may be manually written by a tester. For instance, a test scenario written for a Customer relationship management (CRM) system may include a series of test steps for performing one or more functions of the CRM system. Further, the one or more functions may include (but not limited to) verifying client contact details, notifying sales team about upcoming tasks, tracking of a client's account history for repeated sales or future sales, and sending out automated marketing emails at certain times to clients etc.

Further, the communication device 202 may be configured for receiving a second test case data including a plurality of second test steps. Further, the second test case data corresponds to a second test scenario. Further, in some embodiments, the second test case data may include a second description of a second operation to be performed, a second test data, a second precondition, a second expected result of the second operation, and a second post-condition.

Further, the system 200 may include a processing device 204 configured for identifying a common test step between the plurality of first test steps and the plurality of second test steps. Further, the plurality of first test steps may include a first instance of the common test step and the plurality of second test steps may include a second instance of the common test step. Further, in some embodiments, the first instance of the common test step may be similar to the second instance of the common test step. Further, the processing device 204 may be configured for analyzing each of the first instance of the common test step and the second instance of the common test step. Further, the processing device 204 may be configured for generating a similarity score based on the analyzing. Further, the similarity score may be associated with the first instance of the common test step and the second instance of the common test step. Further, the processing device 204 may be configured for comparing the similarity score with a predetermined threshold. Further, the identifying of the at least one common step may be based on the comparing. Further, in some embodiments, the identifying may be based on machine learning. Further, in some embodiments, the identifying may include textual analysis of each of the first description and the second description.

Further, the processing device 204 may be configured for generating a plurality of first test results associated with the plurality of first test steps based on execution of the plurality of first test steps. Further, a first test result corresponding to the common test step may include a common test result.

Further, the processing device 204 may be configured for associating each of the first instance of the common test step and the second instance of the common test step with the common test result corresponding to the common test step.

Further, the processing device 204 may be configured for generating a plurality of second test results associated with the plurality of second test steps based on the associating and execution of the plurality of second test steps, except the second instance of the common test step.

Further, the system 200 may include a storage device 206 configured for storing the plurality of first test results in association with the plurality of first test steps.

In further embodiments, the communication device 202 may be configured for receiving a propagating criterion. In some embodiments, the propagating criterion may include a propagation scope indicator. Further, in some embodiments, the propagation scope indicator may include one or more of a test cycle indicator, a test session indicator, an application version indicator, and a software suite indicator. Further, the associating of the common test result with the second instance of the common test step may be based on the propagating criterion.

In further embodiments, the processing device 204 may include a first processing device and a second processing device communicatively coupled to the first processing device. Further, the generating of the plurality of first test results may be performed by the first processing device. Further, the generating of the plurality of second test results may be performed by the second processing device.

FIG. 3 is a flowchart of a method 300 of facilitating execution of test cases, in accordance with some embodiments. Accordingly, at 302, the method 300 may include receiving, using a communication device (such as the communication device 202), a first test case data including a plurality of first test steps. Further, the first test case data corresponds to a first test scenario. Further, in some embodiments, the first test case data may include a first description of a first operation to be performed, a first test data, a first precondition, a first expected result of the first operation, and a first post-condition.

Further, at 304, the method 300 may include receiving, using the communication device, a second test case data including a plurality of second test steps. Further, the second test case data corresponds to a second test scenario. Further, in some embodiments, the second test case data may include a second description of a second operation to be performed, a second test data, a second precondition, a second expected result of the second operation, and a second post-condition. Further, in some embodiments, each of the first test scenario and the second test scenario corresponds to one or more of a software testing and a hardware testing. Further, in some embodiments, the hardware testing may be associated with a sensor network (such as the sensor network 112).

Further, at 306, the method 300 may include identifying, using a processing device (such as the processing device 204), a common test step between the plurality of first test steps and the plurality of second test steps. Further, the plurality of first test steps may include a first instance of the common test step and the plurality of second test steps may include a second instance of the common test step. Further, in some embodiments, the identifying may be based on machine learning. Further, in some embodiments, the identifying may include textual analysis of each of the first description and the second description. Further, in some embodiments, the first instance of the common test step may be similar to the second instance of the common test step. Further, the identifying may include analyzing each of the first instance of the common test step and the second instance of the common test step. Further the identifying may include generating a similarity score based on the analyzing. Further, the similarity score may be associated with the first instance of the common test step and the second instance of the common test step. Further, the identifying may include comparing the similarity score with a predetermined threshold. Further, the identifying of the at least one common step may be based on the comparing.

Further, at 308, the method 300 may include generating, using the processing device, a plurality of first test results associated with the plurality of first test steps based on execution of the plurality of first test steps. Further, a first test result corresponding to the common test step may include a common test result.

Further, at 310, the method 300 may include storing, using a storage device (such as the storage device 206), the plurality of first test results in association with the plurality of first test steps.

Further, at 312, the method 300 may include associating, using the processing device, each of the first instance of the common test step and the second instance of the common test step with the common test result corresponding to the common test step.

Further, at 314, the method 300 may include generating, using the processing device, a plurality of second test results associated with the plurality of second test steps based on the associating and execution of the plurality of second test steps, except the second instance of the common test step.

In further embodiments, the method 300 may include receiving, using the communication device, a propagating criterion. Further, the associating of the common test result with the second instance of the common test step may be based on the propagating criterion. Further, in some embodiments, the propagating criterion may include a propagation scope indicator. Further, in some embodiments, the propagation scope indicator may include one or more of a test cycle indicator, a test session indicator, an application version indicator, and a software suite indicator.

In further embodiments, the processing device may include a first processing device and a second processing device communicatively coupled to the first processing device. Further, the generating of the plurality of first test results may be performed by the first processing device. Further, the generating of the plurality of second test results may be performed by the second processing device.

FIG. 4 is a flowchart of a method 400 of facilitating execution of test scenarios, in accordance with some embodiments. Accordingly, at 402, the method 400 may include receiving, using a communication device (such as the communication device 202), a plurality of test case data corresponding to a plurality of test scenarios.

Further, at 404, the method 400 may include analyzing, using a processing device (such as the processing device 204), the plurality of test case data.

Further, at 406, the method 400 may include identifying, using the processing device, at least one common test item among the plurality of test case data. Further, the plurality of test case data may include a plurality of instances of the at least one common test item.

Further, in some embodiments, the at least one common test item may include at least one common test step. Further, the at least one test result may be associated with the at least one common test step. Further, the method 400 may include storing the at least one test result in association with the at least one common test step.

Further, at 408, the method 400 may include executing, using the processing device, at least one test based on at least one test case data including the at least one common test item.

Further, at 410, the method 400 may include storing, using a storage device (such as the storage device 206), at least one test result based on executing of the at least one test.

Further, at 412, the method 400 may include associating, using the processing device, the at least one test result with each instance of the at least one common test item among the plurality of test case data. Further, at least one portion of a test associated with an instance of the at least one common test item may be not executed.

FIG. 5 illustrates a flowchart of a method 500 for performing testing, in accordance with some embodiments. Accordingly, at 502, the method 500 may include obtaining multiple test scenarios (or test cases) from one or more data sources (such as the databases 108). A test scenario may include a series of test steps. Further, each test step, in an instance, may be independent from the other test steps. Further, each of the test scenarios may provide one or more of a description of an operation to be performed by the test scenario, test data, preconditions, expected result of the operation performed, and post conditions. Further, the multiple test scenarios may be generated automatically based on various functions to be tested. Further, the multiple test scenarios may be manually written by a tester. For instance, the test scenarios may be generated based upon parameters related to the functions to be tested. For example, a test scenario written for a Customer Relationship Management (CRM) system may include a series of test steps for performing one or more functions of the CRM system. Further, the one or more functions may include (but not limited to) verifying client contact details, notifying sales team about upcoming tasks, tracking of a client's account history for repeated sales or future sales, and/or sending out automated marketing emails at certain times to clients.

Further, at 504, the method 500 may include identifying one or more common steps in the multiple test scenarios. For the multiple test scenarios, one or more of a description of the operation to be performed by the test scenario, test data, preconditions, expected result of the operation performed, and post-conditions may be compared to identify one or more common steps in the multiple test scenarios. Further, the comparison may involve one or more of text-based analysis and Natural Language Processing (NLP) analysis.

In further embodiments, the comparison may include calculating a similarity percentage (that may be referred to as a similarity score) between test steps for the multiple test scenarios. The one or more common steps may be identified if the similarity percentage crosses a predefined threshold. The threshold, in an instance, may be defined by a user (such as the user 116).

FIG. 6 illustrates a table 600 containing test results corresponding to three test scenarios (such as Test Scenario 1, Test Scenario 2, Test Scenario 3) in a first test cycle (such as TestCycle1 616), in accordance with an exemplary embodiment. FIG. 7 illustrates a table 700 containing test results corresponding to three test scenarios (such as Test Scenario 4, Test Scenario 5, Test Scenario 6) in a second test cycle (such as TestCycle2 714), in accordance with an exemplary embodiment. Further, the first test cycle and the second test cycle may be related to a particular release of a software application. Further, the tables (such as the table 600 of FIG. 6 and the table 700 of FIG. 7) illustrate test steps of the various test scenarios. Moreover, the tables (of FIG. 6 and FIG. 7) illustrate a step execution status for the various test steps. Further, the table 600, in an instance, may include four columns such as a column for test-scenarios (such as Test Scenarios 602), a column for scenario steps (such as Scenario Steps 604), a column for step execution status (such as Step Execution Status 606), and/or a column for overall scenario status (such as Overall Scenario Status 608). Similarly, the table 700, in an instance, may include four columns such as a column for test-scenarios (such as Test Scenarios 702), a column for scenario steps (such as Scenario Steps 704), a column for step execution status (such as Step Execution Status 706), and/or a column for overall scenario status (such as Overall Scenario Status 708).

Therefore, the method 500 for performing testing (FIG. 5) may identify the one or more common steps in the multiple test scenarios (such as the Test Scenario 1, Test Scenario 2, Test Scenario 3 of FIG. 6, and the Test Scenario 4, Test Scenario 5, Test Scenario 6 of FIG. 7). Accordingly, a CommonImpactStep1 610 step may be found in the Test Scenario 1, the Test Scenario 2 and the Test Scenario 5. Further, a CommonImpactStep2 612 step may be found in the Test Scenario 1, the Test Scenario 2, the Test Scenario 3 and the Test Scenario 4. Further, a CommonImpactStep3 614 step may be found in the Test Scenario 2, the Test Scenario 3 and the Test Scenario 4. Further, a CommonImpactStep4 710 step may be found in the Test Scenario 5 and the Test Scenario 6.

Thereafter, at 506, the method 500 for performing testing (FIG. 5) may include executing a test step in the one or more common steps and obtain a corresponding test result. Accordingly, as shown in FIG. 6 and FIG. 7, a fail 618 test result may be obtained after executing the CommonImpactStep1 610 step (for the Test Scenario 1). Further, a pass 620 test result may be obtained after executing the CommonImpactStep2 612 step (for the Test Scenario 1). Further, a blocked 622 test result may be obtained after executing the CommonImpactStep3 614 step (for the Test Scenario 2). Further, a pass 712 test result may be obtained after executing the CommonImpactStep4 710 step (for the Test Scenario 5).

Thereafter, at 508, the method 500 for performing testing (FIG. 5) may include propagating the obtained test result to other test scenarios. Accordingly, as shown in FIG. 6 and FIG. 7, the fail 618 test result obtained after executing the CommonImpactStep1 610 step (for the Test Scenario 1) may be propagated to the Test Scenario 2 and the Test Scenario 5. Further, the pass 620 test result obtained after executing the CommonImpactStep2 612 step (for the Test Scenario 1) may be propagated to the Test Scenario 2, the Test Scenario 3 and the Test Scenario 4. Further, the blocked 622 test result obtained after executing the CommonImpactStep3 614 step (for the Test Scenario 2) may be propagated to the Test Scenario 3 and the Test Scenario 4. The pass 712 test result obtained after executing the CommonImpactStep4 710 step (for the Test Scenario 5) may be propagated to the Test Scenario 6.

In some embodiments, the user (such as the user 116) may define a scope of propagating the test results. For example, the scope may include one or more of test cycles, testing sessions, application versions, and software suites.

In some embodiments, the method 500 for performing testing (FIG. 5) may be used for hardware testing. For example, the method 500 may be used for testing the sensor network 112. Accordingly, a node of the sensor network 112 may be tested based on a test step. Further, the test result of the test step may then be propagated to the other nodes of the sensor network 112.

In further embodiments, the online platform 100 may enable distributing testing, wherein the testing may be performed on multiple computing machines such as the centralized server 102, the mobile device 104 and the other electronic devices 106.

In further embodiments, the online platform 100 may enable machine learning by obtaining test scenarios and test results from multiple computing machines such as the centralized server 102, the mobile device 104 and the other electronic devices 106. Machine learning may also help in identifying the one or more common steps in the multiple test scenarios (for the method FIG. 5).

With reference to FIG. 8, a system consistent with an embodiment of the disclosure may include a computing device or cloud service, such as computing device 800. In a basic configuration, computing device 800 may include at least one processing unit 802 and a system memory 804. Depending on the configuration and type of computing device, system memory 804 may comprise, but is not limited to, volatile (e.g. random-access memory (RAM)), non-volatile (e.g. read-only memory (ROM)), flash memory, or any combination. System memory 804 may include operating system 805, one or more programming modules 806, and may include a program data 807. Operating system 805, for example, may be suitable for controlling computing device 800's operation. In one embodiment, programming modules 806 may include image-processing module, machine learning module. Furthermore, embodiments of the disclosure may be practiced in conjunction with a graphics library, other operating systems, or any other application program and is not limited to any particular application or system. This basic configuration is illustrated in FIG. 8 by those components within a dashed line 808.

Computing device 800 may have additional features or functionality. For example, computing device 800 may also include additional data storage devices (removable and/or non-removable) such as, for example, magnetic disks, optical disks, or tape. Such additional storage is illustrated in FIG. 8 by a removable storage 809 and a non-removable storage 810. Computer storage media may include volatile and non-volatile, removable and non-removable media implemented in any method or technology for storage of information, such as computer-readable instructions, data structures, program modules, or other data. System memory 804, removable storage 809, and non-removable storage 810 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 800. Any such computer storage media may be part of device 800. Computing device 800 may also have input device(s) 812 such as a keyboard, a mouse, a pen, a sound input device, a touch input device, a location sensor, a camera, a biometric sensor, etc. Output device(s) 814 such as a display, speakers, a printer, etc. may also be included. The aforementioned devices are examples and others may be used.

Computing device 800 may also contain a communication connection 816 that may allow device 800 to communicate with other computing devices 818, such as over a network in a distributed computing environment, for example, an intranet or the Internet. Communication connection 816 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 804, including operating system 805. While executing on processing unit 802, programming modules 806 (e.g., application 820 such as a media player) may perform processes including, for example, one or more stages of methods, algorithms, systems, applications, servers, databases as described above. The aforementioned process is an example, and processing unit 802 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

What is claimed is:

1. A method of facilitating execution of test cases, the method comprising:
    receiving, using a communication device, a first test case data comprising a plurality of first test steps, wherein the first test case data corresponds to a first test scenario;
    receiving, using the communication device, a second test case data comprising a plurality of second test steps, wherein the second test case data corresponds to a second test scenario;
    identifying, using a processing device, a common test step between the plurality of first test steps and the plurality of second test steps, wherein the plurality of first test steps comprises a first instance of the common test step and the plurality of second test steps comprises a second instance of the common test step;
    generating, using the processing device, a plurality of first test results associated with the plurality of first test steps based on execution of the plurality of first test steps, wherein a first test result corresponding to the common test step comprises a common test result;
    storing, using a storage device, the plurality of first test results in association with the plurality of first test steps;
    associating, using the processing device, each of the first instance of the common test step and the second instance of the common test step with the common test result corresponding to the common test step; and
    generating, using the processing device, a plurality of second test results associated with the plurality of second test steps based on the associating and execution of the plurality of second test steps, except the second instance of the common test step.

2. The method of claim 1 further comprising receiving, using the communication device, a propagating criterion, wherein the associating of the common test result with the second instance of the common test step is based on the propagating criterion.

3. The method of claim 2, wherein the propagating criterion comprises a propagation scope indicator.

4. The method of claim 3, wherein the propagation scope indicator comprises at least one of a test cycle indicator, a test session indicator, an application version indicator, and a software suite indicator.

5. The method of claim 1, wherein the processing device comprises a first processing device and a second processing device communicatively coupled to the first processing device, wherein the generating of the plurality of first test results is performed by the first processing device, wherein the generating of the plurality of second test results is performed by the second processing device.

6. The method of claim 1, wherein the identifying is based on machine learning.

7. The method of claim 1, wherein each of the first test scenario and the second test scenario corresponds to at least one of a software testing and a hardware testing.

8. The method of claim 1, wherein the first test case data comprises a first description of a first operation to be performed, a first test data, a first precondition, a first expected result of the first operation, and a first post-condition, wherein the second test case data comprises a second description of a second operation to be performed, a second test data, a second precondition, a second expected result of the second operation, and a second post-condition.

9. The method of claim 8, wherein the identifying comprises textual analysis of each of the first description and the second description.

10. The method of claim 1, wherein the first instance of the common test step is similar to the second instance of the common test step, wherein the identifying comprises:
    analyzing each of the first instance of the common test step and the second instance of the common test step;
    generating a similarity score based on the analyzing, wherein the similarity score is associated with the first instance of the common test step and the second instance of the common test step; and
    comparing the similarity score with a predetermined threshold, wherein the identifying of the at least one common step is based on the comparing.

11. A system for facilitating execution of test cases, the system comprising:
    a communication device configured for:
        receiving a first test case data comprising a plurality of first test steps, wherein the first test case data corresponds to a first test scenario;
        receiving a second test case data comprising a plurality of second test steps, wherein the second test case data corresponds to a second test scenario;
    a processing device configured for:
        identifying a common test step between the plurality of first test steps and the plurality of second test steps, wherein the plurality of first test steps comprises a first instance of the common test step and the plurality of second test steps comprises a second instance of the common test step;
        generating a plurality of first test results associated with the plurality of first test steps based on execution of the plurality of first test steps, wherein a first test result corresponding to the common test step comprises a common test result;
        associating each of the first instance of the common test step and the second instance of the common test step with the common test result corresponding to the common test step;
        generating a plurality of second test results associated with the plurality of second test steps based on the associating and execution of the plurality of second test steps, except the second instance of the common test step; and
    a storage device configured for storing the plurality of first test results in association with the plurality of first test steps.

12. The system of claim 11, wherein the communication device is further configured for receiving a propagating criterion, wherein the associating of the common test result with the second instance of the common test step is based on the propagating criterion.

13. The system of claim 12, wherein the propagating criterion comprises a propagation scope indicator.

14. The system of claim 13, wherein the propagation scope indicator comprises at least one of a test cycle indicator, a test session indicator, an application version indicator, and a software suite indicator.

15. The system of claim 11, wherein the processing device comprises a first processing device and a second processing device communicatively coupled to the first processing device, wherein the generating of the plurality of first test results is performed by the first processing device, wherein the generating of the plurality of second test results is performed by the second processing device.

16. The system of claim 11, wherein the identifying is based on machine learning.

17. The system of claim 11, wherein the first test case data comprises a first description of a first operation to be performed, a first test data, a first precondition, a first expected result of the first operation, and a first post-condition, wherein the second test case data comprises a second description of a second operation to be performed, a second test data, a second precondition, a second expected result of the second operation, and a second post-condition.

18. The system of claim 17, wherein the identifying comprises textual analysis of each of the first description and the second description.

19. The system of claim 11, wherein the first instance of the common test step is similar to the second instance of the common test step, wherein the processing device is further configured for:

analyzing each of the first instance of the common test step and the second instance of the common test step;

generating a similarity score based on the analyzing, wherein the similarity score is associated with the first instance of the common test step and the second instance of the common test step; and comparing the similarity score with a predetermined threshold, wherein the identifying of the at least one common step is based on the comparing.

20. A method of facilitating execution of test scenarios, the method comprising:

receiving, using a communication device, a plurality of test case data corresponding to a plurality of test scenarios;

analyzing, using a processing device, the plurality of test case data;

identifying, using the processing device, at least one common test item among the plurality of test case data, wherein the plurality of test case data comprises a plurality of instances of the at least one common test item;

executing, using the processing device, at least one test based on at least one test case data comprising the at least one common test item;

storing, using a storage device, at least one test result based on executing of the at least one test; and associating, using the processing device, the at least one test result with each instance of the at least one common test item among the plurality of test case data, wherein at least one portion of a test associated with an instance of the at least one common test item is not executed.

\* \* \* \* \*